Patented Sept. 10, 1946

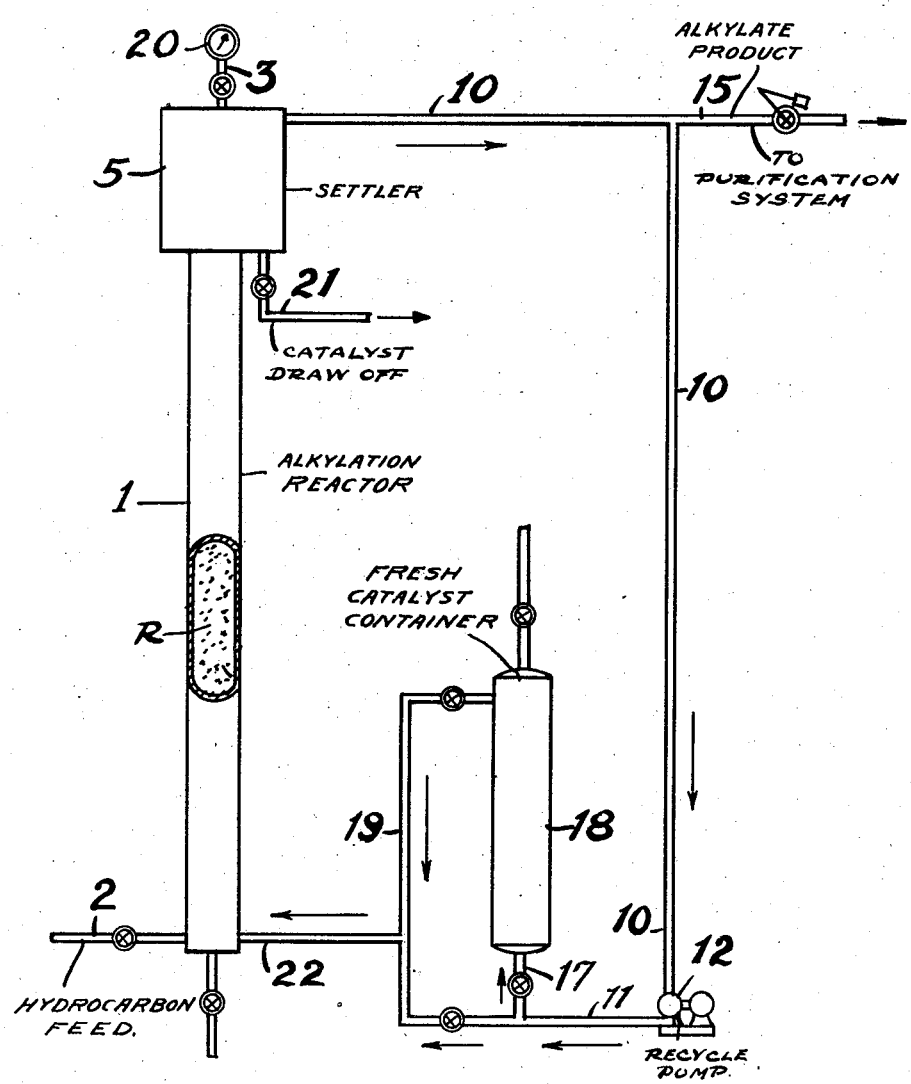

2,407,311

UNITED STATES PATENT OFFICE 2,407,311

CHEMICAL PROCESS

Charles S. Lynch, Plainfield, and Howard G. Codet, Mountainside, N. J., assignors to Standard Oil Development Company, a corporation of Delaware Application March 6, 1943, Serial No. 478,184

9 Claims. (Cl. 260—683.4)

The present invention relates to improvements in the art of producing aviation gasoline and, more particularly, it relates to a method of producing 2,3 dimethylbutane by alkylating ethylene with isobutane. In the application of Ralph M. Hill and Charles H. Watkins, Serial No. 472,192, filed January 13, 1943, there is described a method of alkylating ethylene with a catalyst comprising an aluminum chloride-hydrocarbon complex to yield 2,3 dimethylbutane, a substance which when used as a fuel in an internal combustion engine, has a rich mixture performance rating such that, when it is leaded with 4 cc. of lead tetraethyl per gallon, it is superior to pure iso octane plus 6 cc. of lead tetraethyl per gallon. In the aforesaid application, all of the aluminum chloride was added at the begnning of the reaction and after an induction period, the catalyst comprising the said aluminum chloride-hydrocarbon complex was formed whereupon the octane number of the $C_6$ fraction greatly improved. However, this induction period required forty hours before the octane number of the $C_6$ fraction (containing the 2,3 dimethylbutane) attained an octane number of over 90 as determined by the A. S. T. M. method.

We have now discovered a method for improving the operation described in the said application of Ralph M. Hill and Charles H. Watkins, and in its essence our invention involves supplying fresh aluminum chloride to the circulating stream of reactants and recycled product in incremental portions rather than adding the total quantity at the beginning. By thus proceeding, we greatly reduce the induction period required to form the catalytically active aluminum chloride-hydrocarbon complex. It is pointed out that as in the process described in the aforesaid application of Hill et al., the catalyst is formed by the interaction between isoparaffinic, olefinic hydrocarbons and $AlCl_3$.

An object of our invention therefore is to alkylate mono-olefins, particularly ethylene or propylene, with isoparaffins such as isobutane, and the like in the presence of a catalytically active aluminum chloride-hydrocarbon complex under conditions such that the induction period necessary for the formation of a catalytically active aluminum chloride-hydrocarbon complex, which promotes the formation of an alkylate of desired high quality, is greatly reduced.

Another object of our invention is to so operate the alkylation of ethylene with isobutane as to enable the process to function continuously.

Other and further objects of our invention will appear from the following more detailed description and claims.

In the accompanying drawing we have shown a flow plan illustrating a preferred modification of our invention.

Referring to the drawing, 1 is a reactor, carrying a pressure gauge 20, preferably consisting of a cylindrical shell or case, packed with a suitable packing material such as Raschig rings R, and 5 is a settling zone into which reaction products pass from the top of the reactor. In the settler 5, entrained catalyst material, i. e. the $AlCl_3$ hydrocarbon complex collects at the bottom and may be withdrawn through line 21. Of course, other portions of the $AlCl_3$ complex which enter 5 may gravitate back into 1. But 21 provides a method of withdrawing spent catalyst from the system. However, during the early phases of the operation all of the $AlCl_3$ which enters zone 5 gravitates or drains back into reaction zone 1 and it is only after the process is on-stream for a relatively long period of time (100 hours or more) that spent catalyst is withdrawn through line 21, in the ordinary method of operating. However, if the tower should become filled with catalyst and then flowed into zone 5 (thus contaminating the product stream 15) before the time period stated, obviously the valve in line 21 should be opened to draw off catalyst. The product is withdrawn through line 10 and a portion of this material containing in addition to the desired 2,3 dimethylbutane, unreacted isobutane is recycled via line 11 and pump 12 to reactor 1. The remainder of the product is conducted through line 15 to distillation, washing and purification equipment adapted to yield a pure product. The isobutane removed from the product during finishing is recycled to the reactor thru the hydrocarbon feed line 2 for further use in the process. The method of purifying the product is omitted for purposes of simplicity of explanation and because the invention resides in other features of our process.

The recycled material in line 11 may be passed via pipe 17 through fresh $AlCl_3$ container 18 and thence through pipes 19 and 22 into the reactor. Meanwhile, fresh feed containing ethylene and isobutane is discharged into the reactor 1 through pipe 2. The ratio of isobutane to ethylene in the fresh feed may be relatively low, say 4 mols of isobutane to 3 of ethylene. However, by employing a high recycle ratio, say from 10 to 100 volumes of liquid in recycle line 11 to one volume of liquid feed in line 2, a high internal ratio of isobutane to olefin is maintained in reactor 1. This internal ratio of isoparaffin to olefin may amount from 10 to 100 or more mols of isoparaffin per mol of olefin.

We consider the crux of our invention to reside in the manner of operating the process with respect to the addition of $AlCl_3$ from a reservoir 18. We start the operation by first filling the reactor with liquid isobutane, saturating the isobutane with ethylene at the operating pressure, and then feeding isobutane and ethylene from 2 into the reactor 1. During the first phase of the operations nearly all of the material recovered from the top of the reactor is recycled by way of pipes 11, 17, reservoir 18 and pipes 19 and 22 to the reactor 1. In passing through the reservoir 18 fresh $AlCl_3$ is absorbed or acquired by the flowing stream of reactants. After that, the recycle stream passes into the reactor and after about 8 hours of thus operating a product having an octane number above 90 A. S. T. M. is removed continuously from line 15 for purification.

Further describing our method of operating the system, we have proceeded as follows:

1.8 lbs. of aluminum chloride was placed in the receptacle 18 in four aliquot portions of 0.45 lb. each during the first eight hours of operation.

In other words, at the beginning of the operation 0.45 lb. of aluminum chloride was placed in receptacle 18 and the recycle stock passed through the receptacle containing the aluminum chloride. This was continued for a period of two hours, whereupon a second 0.45 lb. portion of aluminum chloride was added to receptacle 18. This procedure was repeated at the sixth and eighth hours until all of the 1.8 lbs. of aluminum chloride was added. No more aluminum chloride was added after that until at the 54th hour whereupon another 0.22 lb. of aluminum chloride was added to receptacle 18. The addition of aluminum chloride continued at the 66th, 78th, 90th, 102nd, and 114th hours until a total of 3.1 lbs. of aluminum chloride had been added. A temperature of 105° F. and a pressure of 275 lbs. per square inch gauge was maintained within the reactor.

As a result of the operation, we set forth below the data obtained as a result of the continuous run:

ber, namely an octane number of 94 as determined by the A. S. T. M. (American Society for Testing Materials) some time between the 5th and 8th hour so that from at least the 8th hour until the end of the operation the octane number of the $C_6$ fraction was considerably above 90.

We set forth below the result of a second run which we made, including operating conditions and an inspection of the product. In this run, all of the $AlCl_3$ was added at the start of the operation, and it will be noted that the product distribution as well as the yields were low due to excessive cracking, no doubt, as evidenced by the large amounts of low molecular weight hydrocarbons. Also the octane number was low up to 21–24 hours.

*Table II.—Ethylene alkylation*

2.5 lbs. $AlCl_3$ charged to tower at start.
Promoter: ethyl chloride.
Pressure: 275 lbs. sq. in.
Temp.: 105–110° F.
Feed: 27 mols $C_2H_4$/hr.; iso $C_4/C_2$=mol ratio 3/1 (in fresh feed).

| Hours of operation | 5–8 | 13–16 | 21–24 | 29–32 | 37–40 | 45–48 | 53–56 | 65–68 |
|---|---|---|---|---|---|---|---|---|
| Net percent alk. on $C_2$= | 269 | 270 | 260 | 272 | 256 | 245 | 140 | 129 |
| Vol. percent in alkylate: | | | | | | | | |
| IBP—110° F. ($C_5$) | 40 | 31 | 34 | 24 | 14 | 11 | 8 | 5 |
| 110–165° F. ($C_6$) | 39 | 46 | 43 | 52 | 62 | 64 | 64 | 52 |
| 165–265° F. ($C_7$–$C_8$) | 16 | 17 | 16 | 17 | 18 | 18 | 20 | 26 |
| 265° F.+($C_9$+) | 5 | 6 | 7 | 7 | 6 | 7 | 8 | 17 |
| ASTM oct. No.: | | | | | | | | |
| $C_6$ | | 85.7 | 85.6 | 89.1 | 91.9 | 92.5 | 93.6 | |
| $C_7$–$C_8$ | | 69.8 | 85.6 | 73.8 | | | | |

We wish to point out that best results are obtained by maintaining a high recycle ratio. That is to say from 10 to 100 volumes of the product is recycled via line 10 and pump 12 to the reactor per volume of fresh feed (ethylene plus isobutane), in line 2. The purpose of this high recycle ratio is to maintain a high ratio of isoparaffin to olefin in the reactor for it has been found that this high ratio improves both the quality of the product and the yield.

To recapitulate, our present invention relates to a continuous method of alkylating ethylene with isobutane to form substantial quantities of 2,3 dimethybutane which is a very valuable blending agent in the manufacture of aviation fuels. We have found it advantageous to add the catalyst to the system in incremental portions rather than to add the catalyst at one time for we reduce the number of hours necessary for the catalyst to attain maximum activity. In other words, where the catalyst is formed in situ by interaction

*Table I.—Ethylene isobutane alkylation—continuous tower*

Catalyst: $AlCl_3$ (1).
Promoter: $C_2H_5Cl$ (2).
Mol ratio: ¹iso $C_4/C_2$=3.0 (in fresh feed).
Pressure: 275 lbs./sq. in.

| Hours of operation | 5–8 | 9–12 | 17–20 | 29–32 | 33–36 | 41–44 | 49–52 | 57–60 | 61–64 | 73–76 | 81–84 | 93–96 | 105–108 | 117–120 |
|---|---|---|---|---|---|---|---|---|---|---|---|---|---|---|
| Temp., °F. average | 105 | 106 | 104 | 100 | 98 | 94 | 90 | 101 | 105 | 104 | 108 | 108 | 107 | 108 |
| $C_2H_4$ mols/hr. | 10 | 10 | 7.5 | 7.5 | 7.5 | 7.5 | 7.5 | 7.5 | 7.5 | 7.5 | 7.5 | 7.0 | 7.0 | 7.0 |
| Wt. per cent $C_5$+alk. on $C_2H_4$ fed (cumulative) | 171 | 187 | 208 | 222 | 230 | 227 | 221 | 219 | 220 | 223 | 224 | 229 | 230 | 233 |
| Wt. per cent $C_5$+alk. on $C_2H_4$ fed consumed (cumulative) | 197 | 220 | 242 | 262 | 263 | 265 | 271 | 271 | 278 | 282 | 280 | 282 | 280 | 280 |
| Yield gal. alk. (cumulative) | 1.54 | 2.47 | 4.12 | 6.76 | 7.59 | 8.98 | 10.1 | 11.5 | 12.3 | 14.6 | 16.1 | 18.5 | 20.8 | 23.2 |
| Yield gal. alk/lb. $AlCl_3$ (cumulative) | 0.85 | 1.4 | 2.3 | 3.8 | 4.2 | 5.0 | 5.6 | 5.6 | 6.0 | 6.4 | 6.6 | 6.8 | 7.1 | 7.4 |
| Vol. per cent alk.: | | | | | | | | | | | | | | |
| IBP—110° F. ($C_5$) | 5 | 3 | 4 | 2 | 3 | 3 | 2 | 4 | 6 | 10 | 2 | 14 | 11 | 14 |
| 110–165° F. ($C_6$) | 67 | 66 | 67 | 71 | 70 | 70 | 67 | 63 | 62 | 60 | 61 | 61 | 65 | 62 |
| 165–265° F. ($C_7$+$C_8$) | 21 | 23 | 21 | 20 | 21 | 20 | 22 | 23 | 23 | 22 | 28 | 18 | 18 | 18 |
| Bottoms ($C_9$+) | 7 | 8 | 8 | 7 | 6 | 7 | 9 | 10 | 9 | 8 | 9 | 7 | 6 | 6 |
| Alkylate quality: | | | | | | | | | | | | | | |
| $C_5$ br. No | Nil | | | | | | Nil | | | | | | | |
| $C_6$ br. No | Nil | | | | | | 0.1 | | | | | | | |
| ASTM oct. No | 94.0 | | 94.5 | 93.9 | | 93.4 | 93.8 | | 94.0 | 93.8 | | | | |
| $C_7$+$C_8$ br. No | Nil | | | | | | 0.1 | | | | | | | |
| ASTM oct. No | 83.2 | | | 88.4 | | | | | 88.6 | | | | | |

¹ Iso $C_4$=isobutane    $C_2$=ethylene.

It is obvious from the above data that the fraction of the product which is the most important fraction, namely the $C_6$ fraction or that fraction boiling from 110–165° F., had a high octane number between the aluminum chloride and hydrocarbon, as is the case in the present process, we have found that there is an induction period during which the alkylate formed, particularly the $C_6$ fraction, is of inferior quality particularly as regards octane rating. We have found that we may reduce the induction period very substantially by adding the catalyst in incremental portions rather than by adding to the system all of the catalyst intended to be used in one total quantity.

In order to operate our process continuously, it is obvious that two or more receptacles 18 should be provided and these may be operated in parallel so that the hydrocarbon recycle in line 11 may be alternately fed through the receptacles, that is to say, while one of the receptacles 18 is being recharged with catalyst, the other may be on the onstream operation thus maintaining continuity of operation.

As to operating conditions in the reaction zone the temperature may vary from 90° to 175° F. with 100° to 110° F. preferred, the pressure may vary from 100 to 1000 lbs. per square inch gauge with 200 to 400 lbs. preferred, and we use from 0.04 lb. to 0.08 lb. of $AlCl_3$ per gallon of alkylate produced in the system.

By an analogous method we may alkylate ethylene, propylene, butylene and other mono-olefins with isobutane or some other isoparaffin such as isopentane.

Many modifications of our invention will readily suggest themselves to those who are familiar with this art.

What we claim is:

1. In the process of continuously alkylating ethylene with an isoparaffin, the improvement which comprises forcing a mixture containing isoparaffin and ethylene through a catalyst charging zone containing aluminum chloride and which can be recharged therewith from time to time whereupon a portion of said aluminum chloride is absorbed in the said mixture, forcing the mixture containing the aluminum chloride into a reaction zone, permitting the ethylene, isoparaffin and aluminum chloride to remain in contact with each other for a sufficient period of time to form a catalytically active aluminum chloride-hydrocarbon complex, thereafter continuing the flow of isoparaffin and ethylene through the catalyst charging zone and through the reaction zone, maintaining the reaction zone at elevated temperatures and pressures during the process and withdrawing from the reaction zone a product containing a $C_6$ fraction of high octane number.

2. The method set forth in claim 1 in which fresh aluminum chloride is added to the catalyst charging zone at spaced intervals of time.

3. The method set forth in claim 1 in which a ratio of at least 100 mols of isoparaffin per mol of olefin is maintained in the reaction zone.

4. A continuous method for alkylating ethylene with isobutane which comprises mixing ethylene with isobutane in a reaction zone containing an inert contact material, withdrawing a mixture of unreacted ethylene and isobutane from said reaction zone, recycling the mixture through a catalyst charging zone containing $AlCl_3$ and thence to a reaction zone, maintaining the circulatory system indicated during the early phases of the process for an induction period sufficiently long to permit the formation of $AlCl_3$ hydrocarbon complex by interreaction of said $AlCl_3$ and said hydrocarbons, simultaneously feeding isobutane and ethylene to said reaction, during said induction period, withdrawing a portion of the stream leaving the reaction zone as product following the induction period, recycling the remainder of the said stream through the catalyst charging zone to the reaction zone, and periodically adding fresh $AlCl_3$ to said catalyst charging zone.

5. The method of claim 4 in which the volume ratio of recycled stream to total volume of fresh feed isobutane and olefin is from 10 to 100 to 1.

6. The method of claim 4 in which the induction period is from 5 to 8 hours.

7. The method specified in claim 4 in which a temperature of from 100° to 110° F. is maintained in the reaction zone.

8. The method specified in claim 4 in which the reaction is carried out at temperatures within the range of from 90–175° F.

9. In the continuous alkylation of ethylene with isobutane, the improvement which comprises providing a body of $AlCl_3$ in a catalyst charging zone, feeding isobutane and ethylene to a reaction zone, withdrawing a recycle stream containing unreacted ethylene and isobutane from said reaction zone, flowing said recycle stream through said body of $AlCl_3$ in the catalyst charging zone to said reaction zone for a period of 5 to 8 hours until the reaction product shows an octane number above 90, then withdrawing the reaction product, and adding $AlCl_3$ in aliquot proportions from time to time by directing the recycle stream through the catalyst charging zone and thereby maintaining the octane number of the product continuously above 90.

CHARLES S. LYNCH.
HOWARD G. CODET.